No. 821,699. PATENTED MAY 29, 1906.
E. W. BROOMALL.
VERTICAL SHAFT BEARING.
APPLICATION FILED MAY 13, 1905.
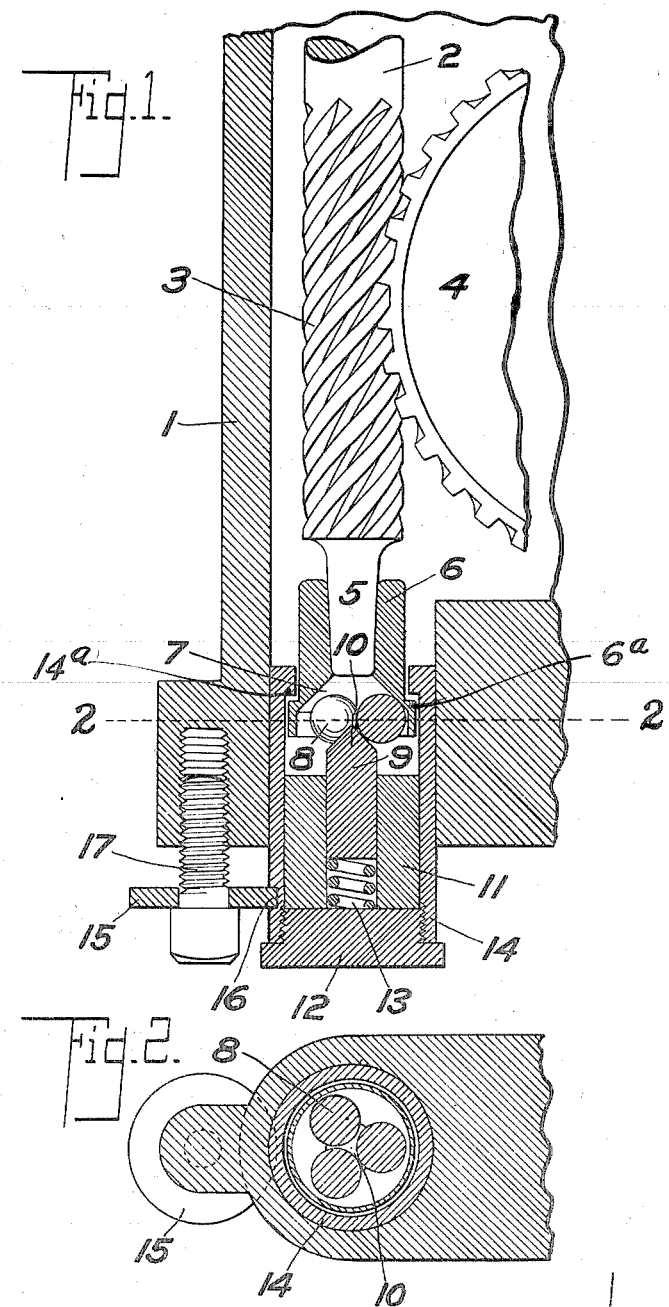

UNITED STATES PATENT OFFICE.

EDGAR W. BROOMALL, OF ROCHESTER, NEW YORK.

VERTICAL-SHAFT BEARING.

No. 821,699.　　　Specification of Letters Patent.　　　Patented May 29, 1906.

Application filed May 13, 1905. Serial No. 260,341.

*To all whom it may concern:*

Be it known that I, EDGAR W. BROOMALL, a citizen of the United States, and a resident of Rochester, in the county of Monroe and State of New York, have invented certain new and useful Improvements in Vertical-Shaft Bearings; of which the following is a specification.

This invention relates to vertical-shaft bearings, and has for its object to reduce the friction of the bearing, to so construct it that the wearing of its parts will not disturb the alinement of the shaft, and to give the vertical shaft a certain amount of play under the driving strain.

Referring to the drawings, Figure 1 shows the invention in vertical section, and Fig. 2 is a horizontal section on the line 2 2 of Fig. 1.

1 represents the casing in which the parts of the mechanism are supported. 2 is a vertical shaft which has a worm 3, and 4 shows a part of a wheel that is suitably supported in the casing 1 and meshes with the worm 3, so as to drive the shaft. The foot of the shaft 5 fits snugly within the collar 6. The lower end of this collar has a conical recess 7, adapted to receive balls 8, three of which are represented in the drawings. The shaft 5 and collar 6 are supported upon the balls by means of a plug 9, whose upper end is tapered to the conical point 10. The point 10 of the plug 9 enters between the three balls 8, so that said balls are supported by said plug and bear against its conical surface. The plug 9 is contained within the central bore of a block 11 and is supported by the cap 12, the spring 13 being interposed between said plug and cap, so as to afford a yielding seat for said plug. The bearing-collar 6 is provided at its lower end with an external annular shoulder 6ᵃ and is passed up through the collar 14 until said shoulder 6ᵃ underlies a similar internal shoulder 14ᵃ within the upper open end of the collar 14, so that the collar 6 cannot be displaced. The cap 12 is screwed into the lower end of the collar 14, which latter thus contains and supports all of the parts of the bearing referred to. The collar 14 is locked within the casing 1 in proper relation to the vertical shaft 2 by any suitable means. In the drawings a disk 15 is shown, which enters a groove 16 in the collar 14 and which receives a bolt 17, that enters the casing. By removing the bolt 17 the collar 14 can be removed, and with it all the parts of the bearing described above, including the collar 6.

The wheel 4 in driving the spindle 2 exerts a downward pressure upon the shaft, which is relieved by the spring 13, and the jar that the parts would otherwise be subjected to on suddenly starting or stopping the machine is taken up by this spring. The vertical shaft 2 will under driving pressure also tend to tilt slightly from its true vertical position, and for this reason a slight space is left between the collars 6 and 14, so that if the vertical shaft 2 is tilted slightly out of alinement the two collars mentioned will not bind together. Moreover, the bearing described is particularly adapted to meet such a contingency, for if the shaft 2 leaves its vertical position the balls 8 immediately adjust themselves between the tapered surface of the recess 7 and the conical end 10 of the plug 9, so that no additional friction is created by deviations in the position of the shaft. It is also true that the conical bearing-surfaces on both sides of the balls 8 give a bearing that must always present the same conical surfaces to the balls whatever wear they may undergo, for the parts in wearing will preserve their respective shapes. By means of the bolt 17 the height of the bearing is adjustable with reference to the shaft.

What I claim is—

1. The combination with a shaft having a recess at its lower end, of a spring-seated plug in longitudinal alinement with the shaft and having a tapering upper end, a plurality of balls between the said recess and tapered end of the plug, and a support within which said parts are held.

2. The combination with a shaft having a recess at its lower end, of a longitudinally-bored block, a plug in said bore, balls between said plug and said recess, a spring on which the lower end of the plug is seated, a sleeve in which said parts are mounted and a cap closing the lower end of the sleeve and securing the said parts in place.

3. The combination with a sleeve having an annular internal shoulder around its upper end and a cap closing its lower end, of a bearing-collar passed up through the sleeve and having its lower end provided with a recess and an external shoulder, a longitudinally-bored block in said sleeve, a plug mounted in the bore of said block, balls between said plug and the recess, and a spring in the lower end of the bore of the block, held in place by said cap.

4. The combination with a sleeve having a cap closing its lower end, of a centrally-bored block held in the sleeve by said cap, a spring in the lower end of the bore of the block, a plug resting on the spring and having a conical upper end projecting above the block, a bearing-collar in the upper end of the sleeve and having a tapering recess in its lower side and balls between the conical plug and the said recess.

5. The combination with a sleeve having a contracted upper end and a cap closing its lower end, of a bearing-collar extending through said contracted upper end and having its lower end enlarged or shouldered to hold it from vertical displacement, a centrally-bored block held in the sleeve by said cap, a plug mounted in the block and balls between the plug and the said bearing-collar.

6. The combination with a casing, a sleeve mounted therein and having a cap closing its lower end, and means for adjusting the sleeve in the casing, of a bearing-collar mounted in the upper end of the sleeve, a spring-supported plug held in the sleeve by said cap and balls between said plug and the said collar.

7. The combination with a casing, and a sleeve mounted therein and having a cap closing its lower end, of a shaft-bearing comprising upper and lower members within said sleeve and a spring held in place by said cap and forming a seat for the lower member of the bearing.

EDGAR W. BROOMALL.

Witnesses:
M. MacArthur,
L. Thon.